(12) United States Patent
Beteille et al.

(10) Patent No.: US 7,110,157 B2
(45) Date of Patent: Sep. 19, 2006

(54) ELECTRICALLY-OPERATED DEVICE WITH VARIABLE OPTICAL AND/OR ENERGETIC PROPERTIES

(75) Inventors: Fabien Beteille, Revel (FR); Gregoire Mathey, Bourg la Reine (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/512,861

(22) PCT Filed: May 22, 2003

(86) PCT No.: PCT/FR03/01557

§ 371 (c)(1),
(2), (4) Date: May 19, 2005

(87) PCT Pub. No.: WO03/098339

PCT Pub. Date: Nov. 27, 2003

(65) Prior Publication Data

US 2005/0213184 A1    Sep. 29, 2005

(30) Foreign Application Priority Data

May 22, 2002  (FR) .................................. 02 06548

(51) Int. Cl.
  *G02F 1/15* (2006.01)
(52) U.S. Cl. ...................... 359/265; 359/273
(58) Field of Classification Search ......... 359/265–275
See application file for complete search history.

(56) References Cited

U.S. PATENT DOCUMENTS

| | | | |
|---|---|---|---|
| 5,187,608 A * | 2/1993 | Blohm et al. ............... | 359/273 |
| 5,253,100 A | 10/1993 | Yang et al. | |
| 5,293,546 A | 3/1994 | Tadros et al. | |
| 5,859,722 A * | 1/1999 | Suga et al. ................. | 359/265 |
| 6,055,088 A * | 4/2000 | Fix et al. .................... | 359/265 |
| 6,178,034 B1 * | 1/2001 | Allemand et al. .......... | 359/265 |
| 6,323,988 B1 * | 11/2001 | Heuer et al. ................ | 359/265 |
| 6,327,069 B1 * | 12/2001 | Allemand et al. .......... | 359/265 |
| 6,466,298 B1 * | 10/2002 | Fix et al. .................... | 359/265 |
| 6,507,428 B1 * | 1/2003 | Heuer et al. ................ | 359/273 |
| 6,529,308 B1 * | 3/2003 | Beteille et al. ............. | 359/265 |

(Continued)

FOREIGN PATENT DOCUMENTS

| | | |
|---|---|---|
| DE | 198 34 834 | 2/2000 |
| EP | 0 961 158 | 12/1999 |

OTHER PUBLICATIONS

Arbizzani, Catia et al. "Polymer-based symmetric electrochromic devices", Solar Energy Materials & Solar Cells, vol. 56, No. 3-4, pp. 205-211, 1999.

(Continued)

*Primary Examiner*—Evelyn A. Lester
(74) *Attorney, Agent, or Firm*—Oblon, Spivak, McClelland, Maier & Neustadt, P.C.

(57) ABSTRACT

Electrically controllable device having variable optical/energy properties in transmission or in reflection, comprising at least one carrier substrate provided with a stack of electrochromic functional layers, including at least two electrochromic active layers, separated by an electrolyte, said stack being placed between two current leads, namely the lower current lead and the upper current lead respectively ("lower" corresponding to the current lead closest to the carrier substrate, as opposed to the "upper" current lead which is furthest from said substrate), characterized in that the electrochromic material constituting the two active layers is identical, and this electrochromic material is chosen from those whose coloration is not a linear function of the charge insertion.

23 Claims, 2 Drawing Sheets

U.S. PATENT DOCUMENTS

Figure 1:
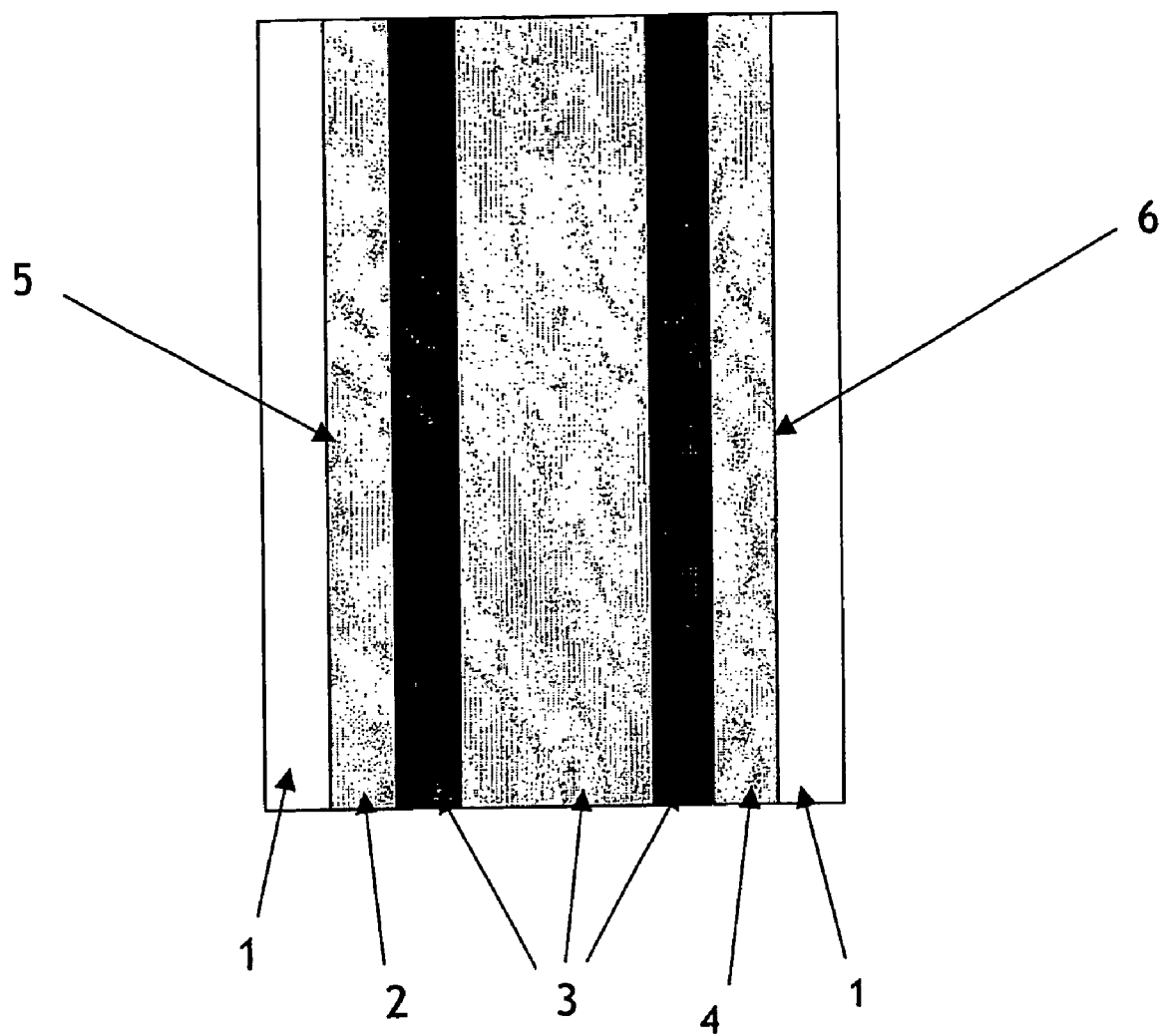

| | | | |
|---|---|---|---|
| 6,747,779 B1 * | 6/2004 | Morin et al. | 359/265 |
| 6,791,737 B1 * | 9/2004 | Giron | 359/265 |
| 6,791,738 B1 * | 9/2004 | Reynolds et al. | 359/265 |
| 6,924,919 B1 * | 8/2005 | Hunia et al. | 359/265 |
| 7,002,720 B1 * | 2/2006 | Beteille et al. | 359/265 |
| 2003/0010957 A1 * | 1/2003 | Haering et al. | 252/500 |
| 2004/0053125 A1 | 3/2004 | Giron | |

OTHER PUBLICATIONS

Sapp. Shawn A. et al. "Rapid Switching Solid State Electrochromic Devices Based on Complementary Conducting Polymer Films", Advanced Materials, vol. 8, No. 10, pp. 808-811, 1996.

U.S. Appl. No. 10/530,062, filed Apr. 4, 2005, Beteille et al.

* cited by examiner

ELECTRICALLY-OPERATED DEVICE WITH VARIABLE OPTICAL AND/OR ENERGETIC PROPERTIES

The invention relates to electrically controllable devices having variable optical and/or energy properties. It relates more particularly to devices that use electrochromic systems operating in transmission or in reflection.

Examples of electrochromic systems are described in patents U.S. Pat. No. 5,239,406 and EP-612 826.

Electrochromic systems have been extensively studied. They are known to comprise in general two layers of electrochromic materials separated by an electrolyte and flanked by two electrodes. Each of the electrochromic layers, under the effect of an electrical supply, can inject/eject charges reversibly, the change in their oxidation state as a result of these injections/ejections resulting in a change in their optical and/or thermal properties (for example, in the case of tungsten oxide, a switch from a blue coloration to a colorless appearance).

It is common practice to classify electrochromic systems in three categories:
that in which the electrolyte is in the form of a polymer or a gel; for example, a protonically conducting polymer such as those described in patents EP-253 713 or EP-670 346, or a polymer conducting by lithium ions such as those described in patents EP-382 623, EP-518 754 and EP-532 408, the other layers of the system generally being of an inorganic nature;
that in which the electrolyte is an essentially inorganic layer. This category is often referred to by the term "all-solid-state" system—examples of such may be found in patents EP-867 752 and EP-831 360, French patent application FR-2 791 147 and French patent application FR-2 781 084; and
that in which all the layers are based on polymers, the category then being often referred to by the term "all-polymer" system.

The invention applies especially to electrochromic systems called "all-polymer" systems.

Many applications have already been envisaged for these systems. They are employed most generally as glazing for buildings or as glazing for vehicles, especially as sunroofs, or else, when they operate in reflection and no longer in transmission, as antidazzle rearview mirrors.

Whatever the category of the electrochromic system, the latter generally comprises two layers of electrochromic material separated by a layer of electrolyte and flanked by two conducting layers; it is also apparent that the materials making up the electrochromic layers are in all cases, whether inorganic or organic, complementary and therefore different.

The object of the present invention is therefore to alleviate these drawbacks by proposing an electrochromic system of simplified structure, because of the choice of materials (a single electrochromic material) and the method of deposition.

The subject of the invention is therefore an electrically controllable device having variable optical/energy properties in transmission or in reflection, comprising at least one carrier substrate provided with a stack of functional layers, including at least two electrochromic active layers, separated by an electrolyte, said stack being placed between two current leads, namely the lower current lead and the upper current lead respectively ("lower" corresponding to the current lead closest to the carrier substrate, as opposed to the "upper" lead which is furthest from said substrate), characterized in that the electrochromic material constituting the two active layers is identical, and this electrochromic material is chosen from those whose coloration is not a linear function of the charge insertion.

By using this material, it is possible to produce symmetrical electrochromic systems. This is because the active layers are, on the one hand, produced in an identical material and, on the other hand, these layers are positioned on either side of the electrolyte. The thicknesses and the initial rates of insertion of the two electrochromic active layers are calculated to give maximum contrast.

In preferred embodiments, the invention may furthermore have, optionally, one or more of the following provisions:
the material constituting the electrolyte is chosen from polyoxyalkylenes;
the electrolyte contains polyoxyethylene;
the electrolyte is a self-supporting film;
the material constituting the electrochromic active layer contains a conducting polymer;
the material constituting the electrochromic active layer contains poly(3,4-ethylene dioxythiophene) or one of its derivatives;
the material constituting the electrolyte and the material constituting the electrochromic active layer are polymerized within an interpenetrating network;
the material constituting the electrolyte and the material constituting the electrochromic active layer are polymerized within a semi-interpenetrating network;
the interpenetrating or semi-interpenetrating network has a composition gradient;
the device forms an electrochromic or viologen-based system;
the device constitutes a vehicle sunroof, that can be autonomously activated, or a vehicle side window or rear window;
the device constitutes a windshield or a portion of a windshield;
the device is located in the upper part of the windshield, especially in the form of one or more bands going around the outline of the windshield;
the device is located in the middle part of the windshield, especially in order to prevent the driver from being dazzled at night, by means of automated regulation of its power supply using at least one camera and/or at least one light sensor;
the device constitutes a graphical and/or alphanumeric information display panel, glazing for buildings, a rearview mirror, an aircraft windshield or cabin window, or a roof window;
the device constitutes interior or exterior glazing for buildings, or is used as a shop showcase or countertop display case, which may be curved, or else is used as glazing for protecting an object of the painting type, as an antiglare computer screen, or as glass furniture;
the device operates in transmission or in reflection;
the device includes at least one clear or bulk-tinted, flat or curved, transparent substrate of polygonal shape or at least partly curved;
the device includes an opaque or opacified substrate;
the electronic conductivity of at least one of the active layers is sufficient to replace the conducting layers with a grid of wires;
the conducting wires enhance the conductivity of the active layers in order to guarantee color uniformity; and
the device incorporates another functionality.

Figure 2:
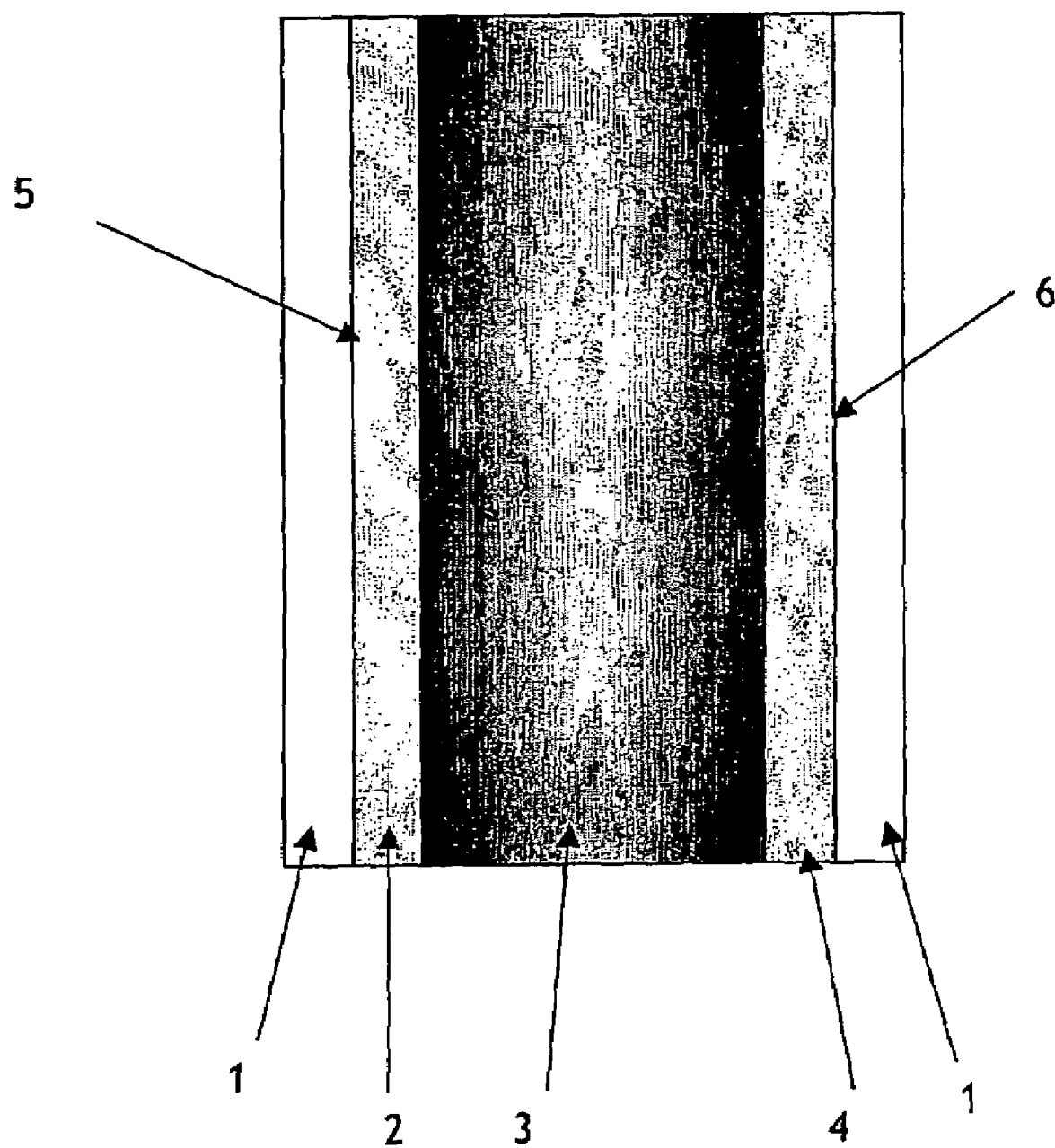

The invention will be described in greater detail in conjunction with the appended drawings in which:

FIG. 1 is a schematic view of an electrically controllable device according to the invention, produced according to a first embodiment; and FIG. 2 is a schematic view of an electrically controllable device according to the invention, produced according to a second embodiment.

In the appended drawings, some of the elements have been shown on a larger or smaller scale than in reality, so as to make the drawings easier to understand.

FIG. 1 shows a glass plate 1 provided with a lower conducting layer 2, with an active stack 3, surmounted by an upper conducting layer 4, with a first grid of conducting wires 5 or an equivalent device for taking the electric current above the upper conducting layer and with a second grid of conducting wires 6 or an equivalent device for taking the electric current below the lower conducting layer 2. The current leads are either conducting wires if the electrochromic active layer is sufficiently conducting, or a grid of wires running over or within a layer forming an electrode, this electrode being made of metal or being of the TCO (transparent conductive oxide) type made of ITO, $SnO_2$, or Al:ZnO, or a single conducting layer.

The conducting wires 5, 6 are metal wires, for example made of tungsten (or copper), optionally coated with carbon, with a diameter between 10 and 100 μm and preferably between 20 and 50 μm, these being straight or wavy, and placed on a sheet of PU by a technique known in the wire-heated windshield field, for example a technique described in patents EP-785 700, EP-553 025, EP-506 521 and EP-496 669.

One of these known techniques consists in using a heated press wheel that presses the wire against the surface of the polymer sheet, this press wheel being fed with wire from a feed reel via a wire guide device.

The lower conducting layer 2 is a bilayer formed from a 50 nm SiOC first layer surmounted by a 400 nm $F:SnO_2$ second layer (both layers preferably deposited in succession by CVD on the float glass before cutting).

Alternatively, it may be a bilayer formed from an approximately 20 nm optionally doped $SiO_2$-based first layer (said layer being especially doped with aluminum or boron) surmounted by an approximately 100 to 350 nm ITO second layer (both layers preferably vacuum-deposited in succession by magnetically enhanced reactive sputtering in the presence of oxygen, and optionally hot).

The upper conducting layer is a 100 to 300 nm ITO layer, also deposited by magnetically enhanced reactive sputtering on the active multilayer, or is produced in a manner similar to the lower conducting layer 2.

The active multilayer 3 shown in FIG. 1 is made up of the following:

a first part formed from a layer of electrochromic material, otherwise called the active layer, made of poly(3,4-ethylene dioxythiophene) 10 to 10 000 nm, preferably 50 to 500 nm in thickness (as a variant, it may be one of the derivatives of this polymer) is deposited by known liquid deposition techniques (spray coating, dip coating, spin coating or flow coating), or else by electrodeposition, on a substrate coated with its lower or upper conducting layer forming the electrode (anode or cathode) or more generally the current lead. Whatever the polymer constituting this active layer, this polymer is particularly stable, especially under UV, and operates by the injection or the ejection of lithium ions ($Li^+$) or alternatively $H^+$ ions;

a second part, acting as electrolyte and formed from a layer between 50 nm and 2000 μm, and preferably between 50 nm and 1000 μm, in thickness, is deposited by a known liquid deposition technique (spray coating, dip coating, spin coating or flow coating), between the first and third parts on the first part, or by injection molding. This second part is based on polyoxyalkylene, especially polyoxyethylene (POE) or one of its derivatives.

As a variant, the second part acting as polyoxyalkylene-based electrolyte is in the form of a polymer grid, formed as a self-supporting film.

Within the context of the present invention a film is said to be "self-supporting" when, owing to its mechanical properties, it acquires cohesion, allowing it to be handled, and retains its shape and dimensions, making it easy to handle, transport and assemble. These properties are obtained without the presence of a reinforcing substrate.

As a variant, it may be an inorganic-type electrolyte, for example one based on hydrated tantalum, zirconium or silicon oxide.

This second electrolyte part deposited on the layer of active electrochromic material, which is itself supported by the glass or similar substrate, is then coated with a third part whose composition is similar to the first part—namely this third part is made up of a substrate, coated with a current lead (conducting wires, or conducting wires+conducting layer, or only conducting layer), this current lead itself being covered with an active layer.

The three parts together form an electrically controllable device having variable optical and/or energy properties according to a first embodiment.

This electrically controllable device is distinguished from the known devices of the prior art, especially by the fact that the layers of electrochromic or active material are identical, they are made in an identical material (there may simply be differences in the choice of thicknesses of these two layers) and they make it possible to obtain a generally electrochromic multilayer that generates significant contrast levels (between 2 and 20).

However, it should be noted that the best results and/or performance in terms of durability and contrast level are obtained with approximately equal thicknesses of electrochromic layers, unlike the known solutions of the prior art for which results are obtained with very different thicknesses of electrochromic layers (the ratio of the thickness of one of the layers to that of the other is at least 5).

Given below, for two different multilayer configurations (total thickness of the electrochromic layers A and B are different (A takes on a color)), the contrast values obtained compared with an advantageous configuration of the invention (A=B):

| Ratio (layer A thickness/layer B thickness) | Contrast (high $T_L$/low $T_L$) |
| --- | --- |
| 0.18 | 1.5 |
| 0.4 | 2.1 |
| 1 | 2.6 |
| 2.5 | 2.5 |
| 5.7 | 1.8 |
| 0.33 | 2.2 |
| 0.57 | 2.8 |
| 1 | 3.1 |
| 1.75 | 2.9 |
| 3.3 | 2.4 |

Analysis of the table shows that, for approximately equal thicknesses of electrochromic material, the performance of the system is optimum (contrast level achieved) and the system is better as regards its reversibility (switching from a colored state to a colorless state, and vice versa, not limited by the layer of smallest thickness).

According to a second embodiment of the invention, the electrically controllable device is no longer produced as a result of successively assembling separately obtained layers, but from a single self-supporting film.

This self-supporting film is defined in the following manner: it is a polymer film that incorporates both the two layers of electrochromic material and the electrolyte, and which has its own mechanical properties (strength, stiffness, etc.).

According to a first variant of this self-supporting film, it is obtained from a more complex system called an interpenetrating network of 3,4-ethylene dioxythiophene (PEDT) or of its derivatives and of polyoxyalkylene molecules.

One definition of an interpenetrating network (or IPN) is as follows: it is a matrix of at least two crosslinked polymers one within the other. It is a polymer alloy that combines the properties of the constituent polymers. They are materials in which the size of the domains defined by the entanglement of the crosslinked polymers is generally of the order of a few tens of nanometers.

In a second variant of this self-supporting film, it is obtained from a simple system called a semi-interpenetrating network (or semi-IPN); the 3,4-ethylene dioxythiophene molecules are polymerized in a polyoxyalkylene network (the electrolyte). For example, the polyoxyalkylene network results from the radical copolymerization of a monofunctional polyoxyethylene (POE) and of a difunctional polyoxyethylene (POE) in proportions and of length that may vary. A semi-interpenetrating network is any matrix formed from at least one polymer network and at least one second polymer entangled within the first network but not forming a second network.

Whatever the variant of this self-supporting film and depending on the conditions under which it is obtained, it is possible to obtain a number of film configurations ranging from a system comprising three well-defined layers (excluding the electronically conducting layers forming the electrodes) (said three layers comprising two electrochromic layers separated by an electrolyte layer), similar in its construction to that obtained with the first embodiment, to a system in which the interfaces are more or less diffuse, or indeed one with more than just a single layer having composition gradients. Nevertheless, the electronic conductivity of at least one of the active layers is sufficient to replace the conducting layers with a grid of wires.

Thus, IPNs or semi-IPNs are produced with, for example, the following compositions:

| POE | PC (polycarbonate) | PEDT |
| --- | --- | --- |
| 50% | 50% | 10% |
| 80% | 20% | 5% |
| 100% | 0% | 2% |

The POE/PC ratio is expressed as a percentage of the initial monomer. The percentage of PEDT is expressed with respect to the percentage of POE monomer. The composition of the POE/PC network complies with that of the initial monomer mixture. However, the percentage of PEDT in the final network depends on the polymerization time of the EDT monomer. The thickness of the IPNs or semi-IPNs thus obtained is between 50 and 2000 μm and preferably between 250 and 500 μm.

These two types of network have a number of advantages over a conventional assembly technique (electrically controllable device according to the first embodiment):

a single film can be used on an industrial scale for inserting the electrochromic functions into the applications envisioned (described below);

copolymerization of the two polymer species (the electrochromic polymer and the electrolyte polymer) generates conducting outer layers that create de facto electrodes (anode and cathode) without having the drawbacks thereof (delamination); and the electrochromic material is protected from the outside, thereby increasing the lifetime of the electrically controllable device.

Moreover, the two glass plates forming the substrates of the electrically controllable device that were described above are made of standard, flat clear soda-lime silicate glass, each with a thickness of about 2 mm.

The invention applies in the same way to curved and/or toughened glass.

Likewise, at least one of the glass plates may be bulk-tinted, especially tinted in blue or green, or gray, bronze or brown.

The substrates used according to the invention may also be based on a polymer (PMMA, PC, etc.). It should also be noted that the substrates may have very varied geometrical shapes: they may be squares or rectangles, but also any at least partly curved polygon or profile, defined by rounded or undulating outlines (round, oval, "waves", etc.).

Moreover, at least one of the two glass plates (on that face not provided with the electrochromic system or equivalent) may be covered with a coating having another functionality (this other functionality possibly being, for example, a solar-protection multilayer, an antifouling multilayer, or other multilayer). As solar-protection multilayer, it may be a multilayer composed of thin films deposited by sputtering and including at least one film of silver. It is thus possible to have combinations of the type:

glass/electrochromic system/solar-protection films/glass;
glass/electrochromic system/glass/thermoplastic/glass;
glass/electrochromic system/thermoplastic/glass; and
glass/thermoplastic/electrochromic system/thermoplastic/glass.

The thermoplastic may be chosen from PVB, PU and EVA.

The solar-protection coating may also be deposited not on one of the glass plates but on a sheet of flexible polymer of the PET (polyethylene terephthalate) type.

For examples of solar-protection coatings, the reader may refer to patents EP 826 641, EP 844 219, EP 847 965, WO 99/45415 and EP 1 010 677.

The device forming the subject matter of the invention described above may also be incorporated into a three-glass "substrate", the latter being advantageously used in the production of glazing units that meet safety requirements.

The present application is the U.S. counterpart of WO 03/098339, the text of which is incorporated by reference and claims the priority of the French application No. 02/06548 filed on May 22, 2002, the text of which is incorporated by reference.

The invention claimed is:

1. An electrically controllable device having variable optical/energy properties in transmission or in reflection, comprising at least one carrier substrate provided with a stack of electrochromic functional layers, including at least two electrochromic active layers, separated by an electrolyte, said stack being placed between two current leads, namely the lower current lead and the upper current lead respectively ("lower" corresponding to the current lead closest to the carrier substrate, as opposed to the "upper" current lead which is furthest from said substrate), wherein the electrochromic material constituting the two active layers is identical, and this electrochromic material is chosen from those whose coloration is not a linear function of the charge insertion.

2. The device as claimed in claim 1, wherein the material constituting the electrolyte contains a polyoxyalkylene.

3. The device as claimed in claim 2, wherein the electrolyte contains polyoxyethylene.

4. The device as claimed in claim 2 wherein the electrolyte is a self-supporting film.

5. The device as claimed in claim 1, wherein the material constituting the electrochromic active layer contains a conducting polymer.

6. The device as claimed in claim 5, wherein the material constituting the electrochromic active layer contains poly(3, 4-ethylene dioxythiophene) or one of its derivatives.

7. The device as claimed in claim 1 wherein the material constituting the electrolyte and the material constituting the electrochromic active layer are polymerized within an interpenetrating network.

8. The device as claimed in claim 1 wherein the material constituting the electrolyte and the material constituting the electrochromic active layer are polymerized within a semi-interpenetrating network.

9. The device as claimed in claim 7 wherein the interpenetrating network has a composition gradient.

10. The device as claimed in claim 1 wherein the device is an electrochromic or viologen-based system.

11. The device as claimed in claim 1 wherein the device is a vehicle sunroof, that can be autonomously activated, or a vehicle side window or rear window.

12. The device as claimed in claim 1 wherein the device is a windshield or a portion of a windshield.

13. The device as claimed in claim 12, wherein the device is located in the upper part of the windshield, especially in the form of one or more bands going around the outline of the windshield.

14. The device as claimed in claim 12, wherein the device is located in the middle part of the windshield, especially in order to prevent the driver from being dazzled at night, by means of automated regulation of its power supply using at least one camera and/or at least one light sensor.

15. The device as claimed in claim 1 wherein the device is a graphical and/or alphanumeric information display panel, glazing for buildings, a rearview mirror, an aircraft windshield or cabin window, or a roof window.

16. The device as claimed in claim 1 wherein the device is:
   interior or exterior glazing for buildings;
   a shop showcase or countertop display case, which may be curved;
   glazing for protecting an object of the painting type;
   an antiglare computer screen;
   glass furniture.

17. The device as claimed in claim 1 wherein the device operates in transmission or in reflection.

18. The device as claimed in claim 1 wherein the device includes at least one clear or bulk-tinted, flat or curved, transparent substrate of polygonal shape or at least partly curved.

19. The device as claimed in claim 1 wherein the device includes an opaque or opacified substrate.

20. The device as claimed in claim 1 wherein the electronic conductivity of at least one of the active layers is sufficient to replace the conducting layers with a grid of wires.

21. The device as claimed in claim 1 wherein the conducting wires enhance the conductivity of the active layers in order to guarantee color uniformity.

22. The device as claimed in claim 1 wherein the device incorporates another functionality, it being possible for this functionality to be, for example, a solar-protection multilayer, an anti-fouling multilayer or other multilayer.

23. The device as claimed in claim 8 wherein the semi-interpenetrating network has a composition ingredient.

* * * * *